Jan. 26, 1943.  J. J. KACIC  2,309,597
AUTOMATIC CLUTCH
Filed Jan. 30, 1941  2 Sheets-Sheet 1
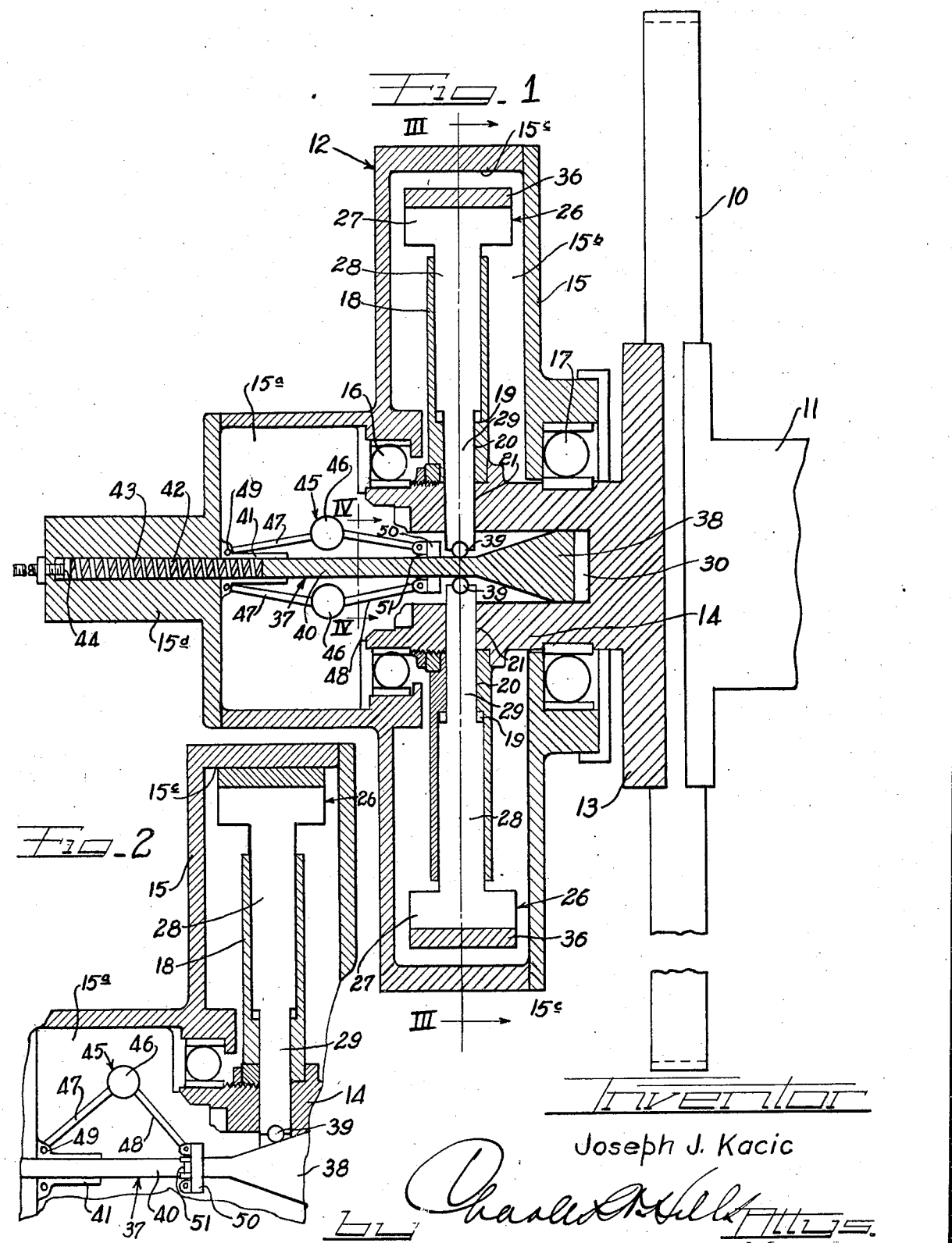
Inventor
Joseph J. Kacic Jan. 26, 1943.                J. J. KACIC                2,309,597
                          AUTOMATIC CLUTCH
              Filed Jan. 30, 1941            2 Sheets—Sheet 2
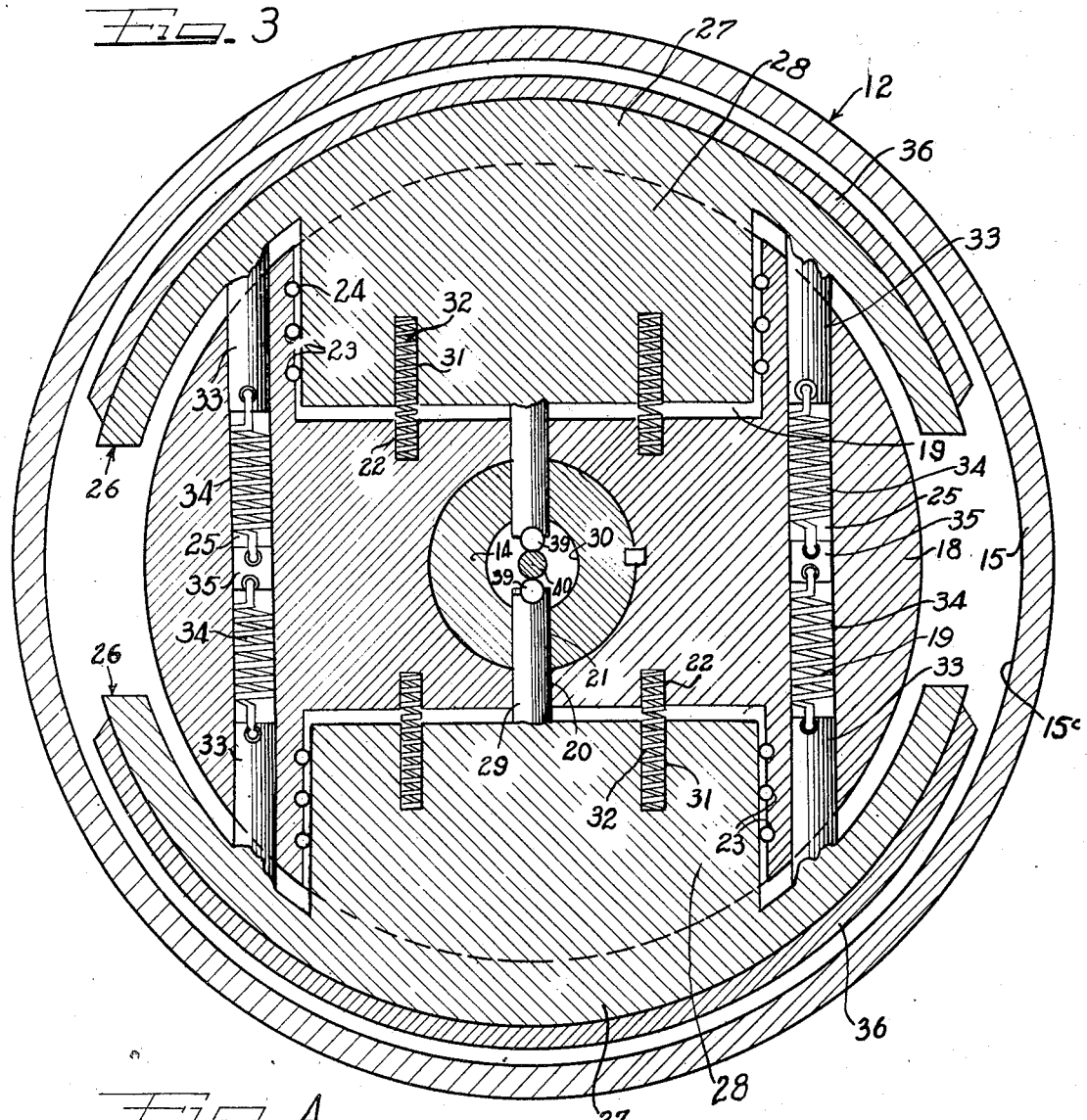
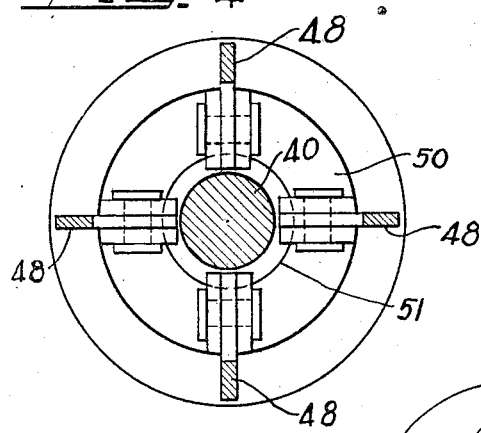
Inventor
Joseph J. Kacic Patented Jan. 26, 1943

2,309,597

UNITED STATES PATENT OFFICE 2,309,597

AUTOMATIC CLUTCH

Joseph J. Kacic, Chicago, Ill., assignor of one-half to Albert E. Norman, Evanston, Ill.

Application January 30, 1941, Serial No. 376,590

7 Claims. (Cl. 192—105)

This invention relates to an automatic coupler or clutch, and more specifically relates to a centrifugally controlled mechanical friction-type coupler which will not fluctuate due to minute changes in driving speed.

Centrifugally operated friction clutches are quite sensitive to minute changes in driving speed and will fluctuate between engaged and disengaged positions whenever the driving speeds approach the point where centrifugal force just about balances the gravity effect on the clutch element or spring tension acting on the clutch element. As a result, centrifugal clutches of the friction type do not wear well and soon permit extensive slippage between the driving and driven members.

The present invention now provides a governor-controlled lock for the clutch element to prevent fluctuation of the element. This lock is controlled through a centrifugal governor on the driven member and is not only operative to maintain the clutch element in engaged position until the driven member falls below a predetermined speed but is also effective to initiate engagement of the clutch element whenever the speed of the driven member exceeds the speed of the driving member and the driving member is not rotating fast enough to effect centrifugal movement of the clutch element.

It is, then, an object of this invention to provide an automatic clutch having centrifugally operated clutch elements and a control device for said clutch elements to prevent repeated fluctuations of the elements.

A further object of the invention is to provide a centrifugally operated friction-type clutch with a lock for the clutch shoes controlled by the speed of the driven member.

A further object of this invention is to provide a centrifugal governor in an automatic clutch for maintaining the clutch element in engaged position whenever the driven member is rotated above a predetermined speed.

Another object of this invention is to provide a clutch with a set of clutch shoes sensitive to centrifugal force together with a cam device controlled by a separate governor for acting on the clutch shoes.

A specific object of the invention is to provide a centrifugal governor in a friction-type automatic clutch for controlling a device acting on the clutch shoes to either maintain the shoes in engaged position or move the shoes to engaged position whenever the driven member of the clutch rotates above a predetermined speed.

Other and further objects of the invention will be apparent to those skilled in the art from the following detailed description of the annexed sheets of drawings which, by way of example, illustrate a preferred embodiment of the invention.

On the drawings:

Figure 1 is a longitudinal cross-sectional view of an automatic clutch according to this invention and illustrating parts in elevation.

Figure 2 is a fragmentary cross-sectional view of a portion of the clutch illustrating the operation of the centrifugal governor.

Figure 3 is a transverse cross-sectional view, with parts in elevation, taken along the line III—III of Figure 1.

Figure 4 is an enlarged cross-sectional view taken along the line IV—IV of Figure 1.

As shown on the drawings:

In Figure 1 the reference numeral 10 designates the flywheel of a prime mover (not shown) having a driven crank shaft 11 for rotating the flywheel 10.

The clutch 12 of this invention, as shown in Figures 1 and 2, includes a driving member 13 secured to the flywheel 10 to be rotated therewith. The driving member 13 has a hub portion 14 around which is rotatably mounted a housing or drum 15. Ball bearings 16 and 17 freely mount the housing 15 around the hub 14.

A circular block 18 is affixed to the hub 14 within the housing 15 and rotates in the housing with the driving member 13.

The block 18 has a pair of recesses 19 extending inwardly from the periphery thereof but terminating in spaced relation from the hub 14 as best shown in Figure 3. Cylindrical bores 20 extend from the bottom of the recesses 19 into communication with bores 21 extending radially through the hub 14.

As best shown in Figure 3, wells 22 are formed in the bottoms of the recesses 19 and extend for a short distance inwardly from said bottoms.

The side walls of the recesses preferably have semispherical depressions 23 therein to receive ball bearings 24.

Cylindrical bores 25 extend completely through the block 18 in spaced parallel relation on each side of the recesses 19.

Clutch shoes 26 having arcuate portions 27 are disposed around the block 18 and have integral body portions 28 extending into the recesses 19 of the block. These body portions 28 carry lugs 29 extending through bores 20 and 21 into a well 30 provided in the hub 14. As shown in Figure 1, this well 30 extends from the end of the hub so as to communicate with a chamber 15a of the housing. The clutch shoes 26 are disposed in a chamber 15b of the housing 15.

Wells 31 extend inwardly from the inner faces of the body portions 28 of the clutch shoes in alignment with the wells 22 of the block 18 for receiving coil springs 32 as shown in Figure 3. The coil springs serve as resilient mountings for the clutch shoes 26.

Cylindrical lugs or pins 33 extend from the arcuate portions 27 of the shoes 26 into the bores 25 of the block and are attached to tension springs 34 disposed in the bores. The inner ends of these tension springs 34 are connected to blocks 35 which are slidably mounted in the bores. The springs 34 draw the shoes 26 away from the housing 15 and are opposed by the springs 32. As a result, the shoes are resiliently mounted on the block 18.

The arcuate portions 27 of the shoes are covered with friction material such as brake linings 36 to act on the brake drum like wall 15c of the housing 15.

The sides of the body members 28 of the clutch shoes 26 can ride against the ball bearings 24 so that the shoes can readily fly outward from fully seated position in the block 18 by centrifugal force against the tension of the springs 34 into engagement with the wall 15c as shown in Figure 2.

In accordance with this invention a lock device 37 is provided for the shoes 26. This lock device 37 has a cone-shaped head 38 slidably mounted in the well 30 of the hub 14 to engage ball bearings 39 in the ends of the lugs 29 as best shown in Figure 1. If desired, of course, the head 38 can directly engage the ends of the lugs 29 but the ball bearings are provided for freedom of action. The device 37 includes a rod or shank portion 40 extending from the head 38 into the chamber 15a of the housing. The end of the shank portion 40 is slidably mounted in a cup 41 carried by the housing 15 and communicating with a well 42 formed in a block portion 15d of the housing. A coil spring 43 is mounted in the well 42 for acting against the end of the shank 40 and compression of this coil spring can be adjusted by means of an adjusting screw 44 extending through the end wall of the portion 15d to the well 42 for acting against the other end of the spring.

As best shown in Figures 1 and 2 a centrifugal governor 45 is disposed around the shank portion 40 of the lock 37 and includes a plurality of weights 46 carried on arms 47 and 48. The arms 47 are pivoted at 49 to the cup 41 which is secured to the housing 15. The arms 48 are pivoted to a collar 50 which slides on the shank 40. An abutment or collar 51 is provided on the shank 40 to engage the collar 50 for sliding the locking device into locking position when the governor weights 46 fly outward.

As indicated in Figure 4, four arms 48 are provided. Likewise four weights 46 and four arms 47 are provided in the governor 45. The governor 45 is sensitive to centrifugal force and must rotate with the housing 15 since the arms 47 are connected to the cup 41 which is carried by the housing. When the housing 15 rotates at a speed sufficient to throw the weights 46 of the governor outwardly, the arms 47 and 48 will be drawn together as indicated in Figure 2 thereby moving the collar 50 of the governor against the abutment or boss 51 on the shank 40 of the lock member 37. This will slide the lock member 37 against pressure of spring 43 to move the conical head 38 against the ball bearings 39 thereby urging the shoes 26 into engaging position, as shown in Figure 2. The locking device is thus not only operative to hold the previously engaged shoes in engaging position, but is also operative to effect engagement of the shoes.

In operation of the clutch, the driving member 13 rotates the block 18 and carries the shoes 26 therewith. When the rotational speed reaches a point where centrifugal force will overcome the action of the springs 34 on the shoes the shoes will fly outwardly by centrifugal force to engage the friction material 36 with the drum surface 15c of the housing thereby effecting rotation of the housing. The housing will rapidly pick up speed thus rotating the governor 45 which will slide the locking device 37 into locking position against the shoes. The driving member will thus be directly coupled with the housing or driven member. If the speed of the driving member should decrease, disengagement of the shoes 26 will not be effected until the housing slows up sufficiently to enable the spring 43 to act against the governor 45 and slide the locking device out of locking position. As a result, the shoes 26 will not fluctuate due to minute changes of the driving member and the speed of the driven member actually controls disengagement of the shoes.

If, on the other hand, the housing should be positively driven while the driven member 13 is not driven, the governor 45 will be effective to move the locking device for engaging the clutch shoes with the housing 15 thereby effecting a driving of the member 13.

The clutches of this invention are thus capable of having either sides thereof connected to a driving member although in normal operation the member 13 will be the driving member.

I claim as my invention:

1. An automatic coupler comprising a pair of rotatable members, clutch shoes rotated by one of the members and operated by centrifugal force to engage the other of said members for coupling the members together, a centrifugal governor rotated by the other of said members, and a device controlled by the governor for acting on the shoes to maintain the shoes in engaged position or to move the shoes to engaged position whenever said other member rotates above a predetermined speed.

2. A clutch comprising a driven member, a driving member, a set of centrifugal force sensitive elements rotated by the driving member to engage the driven member for coupling the members together, and a lock for said set of clutch elements operated by the driven member to hold the clutch elements in engaged position until the speed of rotation of the driven member falls below a predetermined minimum whereby said clutch elements will not fluctuate upon minute changes in driving speed.

3. An automatic clutch comprising a driving member having a hub portion, a driven member rotatably mounted around said hub portion and defining a chamber, said hub portion having a recess therein, a cam member slidably mounted in said recess of the hub portion, centrifugal force sensitive clutch shoes carried by said hub portion in said chamber and having portions projecting into said recess for engagement with said cam, and a centrifugal governor driven by the driven member for controlling movement of said cam to effect locking of the clutch shoes in engaged position with the driven member whenever the driven member is rotated above a predetermined minimum speed.

4. An automatic clutch comprising a driven member having a centrally recessed hub portion, a driving member having a housing portion rotatably mounted on said hub providing a friction drum, a slotted member secured on said hub portion in said housing, clutch shoes slidably mounted in the slots of said slotted member for engagement with said friction drum, a locking member slidably mounted in said recess of the hub for maintaining the shoes in engaged position, and a centrifugal force sensitive device rotated by the driven member for controlling said locking member.

5. An automatic clutch comprising a driving member, a drum rotatably mounted around said driving member clutch elements on the driving member for engaging said drum, a cam lock acting on said clutch elements to maintain the same in engagement with said drum, and a centrifugal governor rotatable with said driven member for controlling said cam lock.

6. An automatic clutch comprising a driving member having a recessed hub portion, a driven drum rotatable on said hub portion, clutch shoes carried by said hub portion for centrifugal engagement with said drum, a conical lock slidably mounted in the recess of said hub portion for acting on said shoes to maintain the same in engaged position with said drum, a spring urging said conical lock out of engagement with said clutch shoes, and a centrifugal governor driven by said drum for biasing said spring to slide the conical lock into engagement with the shoes.

7. An automatic clutch comprising a driving recessed hub member, a block secured on said hub member having opposed recesses extending inwardly from the periphery thereof, clutch shoes movably mounted in said recesses and having lugs extending through said block and said hub into the recess of the hub, a lock member having a conical head slidably mounted in said recess and a shank extending from said head, said head adapted for thrusting against said lugs of said clutch shoes to force the shoes outward, a driven drum member surrounding said shoes adapted to be frictionally engaged by the shoes, a centrifugal governor mounted around said shank of said locking member and driven by said driven drum member, and a spring urging the conical head of said locking member away from thrusting position whereby rotation of the driving member will effect engagement between said clutch shoes and drum to rotate the drum and whereby rotation of the drum will effect movement of the centrifugal governor to compress said spring and slide the conical head into thrusting position for maintaining said clutch shoes in engagement with said drum.

JOSEPH J. KACIC.